United States Patent

Gertsen

[15] 3,655,069
[45] Apr. 11, 1972

[54] POSITIONER

[72] Inventor: Kai Gertsen, Rochester, N.Y.
[73] Assignee: Sybron Corporation, Rochester, N.Y.
[22] Filed: Dec. 22, 1969
[21] Appl. No.: 886,844

[52] U.S. Cl. ............... 214/1 BT, 198/DIG. 13, 294/65.5, 214/16.4, 214/622
[51] Int. Cl. ............... B66c 1/04
[58] Field of Search .... 214/16.16 B, 1 BH, 1 BV, 1 BT; 294/65.5; 198/DIG. 13

[56] References Cited

UNITED STATES PATENTS

| | | | |
|---|---|---|---|
| 1,977,785 | 10/1934 | Wheelock | 214/16.16 B X |
| 2,751,093 | 6/1956 | Theibault | 214/16.16 B |
| 3,040,909 | 6/1962 | Burnett | 294/65.5 X |

Primary Examiner—Gerald M. Forlenza
Assistant Examiner—George F. Abraham
Attorney—Theodore B. Roessel

[57] ABSTRACT

The invention is a positioner for use with a material handling system wherein wheeled containers are transported through vertical or horizontal shaftways. The positioner includes a conveyor driven boom which can be moved into the shaftway. The boom has magnets nested in one end, which can be cammed outwardly for attachment to the container after the boom has been driven into the shaftway. Reversing the conveyor withdraws the boom and, therefore, the container from the shaft. The positioner is also used to insert containers into the shaft.

10 Claims, 5 Drawing Figures

3,655,069

INVENTOR.
KAI GERTSEN

BY Theodore B Roessel

ATTORNEY

INVENTOR.
KAI GERTSEN

BY Theodore B Roessel

ATTORNEY 3,655,069

POSITIONER

BACKGROUND OF THE INVENTION

The present invention relates generally to a positioning device and, more specifically, to a positioner as may be used to insert or withdraw objects through a shaftway opening.

Material handling systems wherein containers are transported by various devices through both vertical and horizontal shaftways are well known in the art. Heretofore, one common method of loading or unloading materials carried in such a transport system was to have the transporting vehicle programmed to stop automatically at a desired station. The shaftway door at this station would then open to provide access to the container carried by the transport vehicle and a door on the container then opened to permit manual loading or unloading of the material from the container. After loading or unloading, first the container door and then the shaftway door were closed and the transport vehicle programmed for its next destination.

In another method wherein the containers were detachable from the transport vehicle, the transport vehicle could be programmed to deposit the container on a platform extending into the shaftway. The shaftway door was then opened and the container manually pulled through the shaftway opening onto the station floor. Various mechanical devices have also been provided to push or pull the container through the shaftway opening.

In the case of material handling systems for hospitals or in other facilities where space is at a premium, any automatic loading or unloading device must, of course, be compact in order to conserve on space. It must require a minimum of maintenance and must be as automatic in operation as possible. Further, in systems wherein the container is deposited in the shaftway for later pickup by a transport vehicle, the loading and unloading device must accurately position the container within the shaftway so that the container will be in the proper position for attachment to the transport vehicle. The critical nature of the positioning of the container within the shaftway is more acute where the attachment and detachment to the transport vehicle is done without manual control as, for example, in a completely automated system.

SUMMARY OF THE PRESENT INVENTION

The positioner of the present invention can be characterized in one aspect thereof by the provision of a movable cantilevered boom mounted at floor level against a wall surface; a reversible drive for moving the boom into and out of a shaftway opening; magnets nested in one end of the boom for attachment to a container; and a shuttle for driving the magnets from their nest and against the container, the containers being wheeled so that with the containers magnetically attached to the boom, the movement of the boom can drive the containers along the floor surface into and out of the shaftway. A second positioner, mounted at right angles to the first may be provided to facilitate simultaneous receiving and dispatching.

OBJECTS OF THE INVENTION

One object of the present invention is to provide a compact, floor mounted positioner for moving containers through a shaftway opening.

Another object of the present invention is to provide a positioner for moving containers through a shaftway opening wherein the containers are magnetically attached to the positioner.

A further object of the present invention is to provide a positioner for moving containers through a shaftway opening wherein a boom member adapted for attachment to the container is driven by an endless belt into and out of the shaftway opening.

Still another object of the present invention is to provide a positioner for moving containers through a shaftway opening which is automatic in operation and which occupies a minimum of floor space.

These and other objects, advantages and characterizing features of the present invention will become more apparent upon consideration of the following detailed description thereof when taken in connection with the accompanying drawings.

DESCRIPTION OF THE PREFERRED EMBODIMENTS

Figure 1:
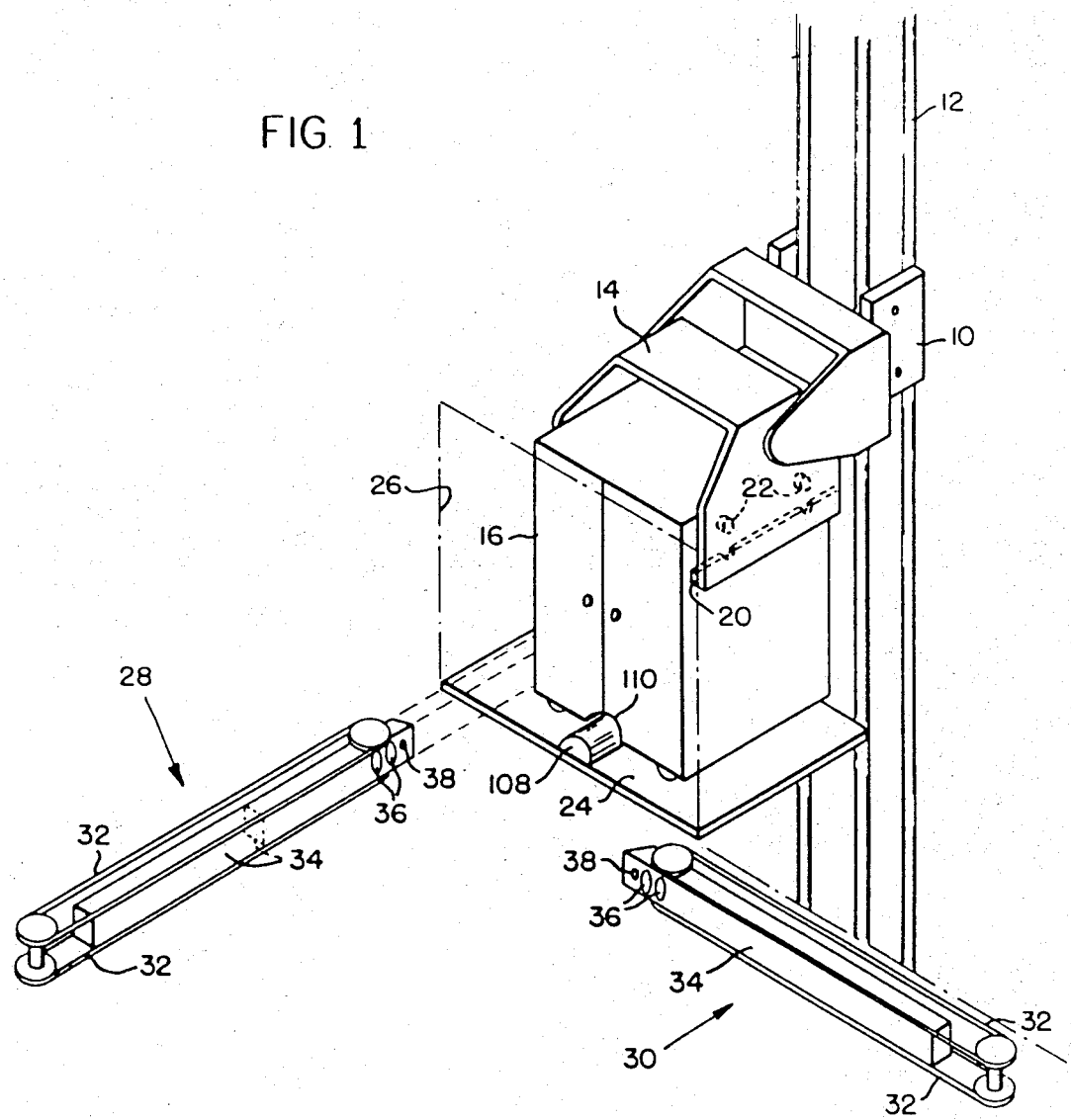
FIG. 1 is a perspective view of a typical station showing a monorail transporter, a platform supporting the container at station level and the positioners of the present invention.

Referring to the drawings, FIG. 1 shows the material handling system to include a monorail supported, self-propelled vehicle or container transport 10. Transporter 10 is capable of traveling along its support rail 12 through both vertical and horizontal courses of travel by drawing electrical power from bus bars (not shown) associated with the rail. Support rail 12 is preferably mounted in a shaftway during vertical courses of travel as, for example, from one floor of a building to another.

The transport vehicle also includes a yoke 14 which is pivoted to the vehicle. Yoke 14 is adapted to releasably carry a wheeled container 16 and is pivoted to the transporter so that both the yoke and the container will always be in a vertical orientation regardless of the inclination of the transporter. This is important in order to prevent spillage of liquids from open containers or shifting of the load carried in the container. The yoke includes a nest member 20 which is adapted to receive corresponding nesting members 22 fixed to the side wall of container 16.

Neither the transporter nor yoke form part of the present invention and it is sufficient for present purposes merely to state that the transporter is rail guided and travels under its own power along vertical and horizontal sections of the guiderail and is capable of accepting a program enabling the transporter to stop at a preset destination and that the container can be detached from the yoke member by moving the container relative to the yoke so as to permit nesting members 22 to clear their respective nests 20. Also forming no part of the present invention is a movable platform 24 which may be pivoted into position to support the container after it is unnested from its transport vehicle. Platform 24 is normally stored in a position out of the path of travel of the transport vehicle so as not to obstruct the free passage of vehicles in the shaftway by the stop station.

As stated hereinabove, trackway 12 is preferably mounted in a shaftway in its vertical course of travel. Once the transport vehicle has arrived at the desired stop station, the positioner apparatus of the present invention will move the container into and out of the shaftway.

As shown in FIG. 1, this apparatus includes a positioner generally indicated at 28 for moving the containers in a direction directly into or out of shaftway opening and a transfer positioner generally indicated at 30 for feeding the containers onto positioner 28. Both positioners are preferably mounted on the floor against a wall surface and have the same general construction as will be more fully described hereinbelow.

As shown in FIG. 1, positioners 28 and 30 both include a pair of endless belts 32 which drives a boom member 34. A magnetic member 36 and a switch 38 mounted on one end of the boom provides for attachment of the boom to the container.

Figure 2:
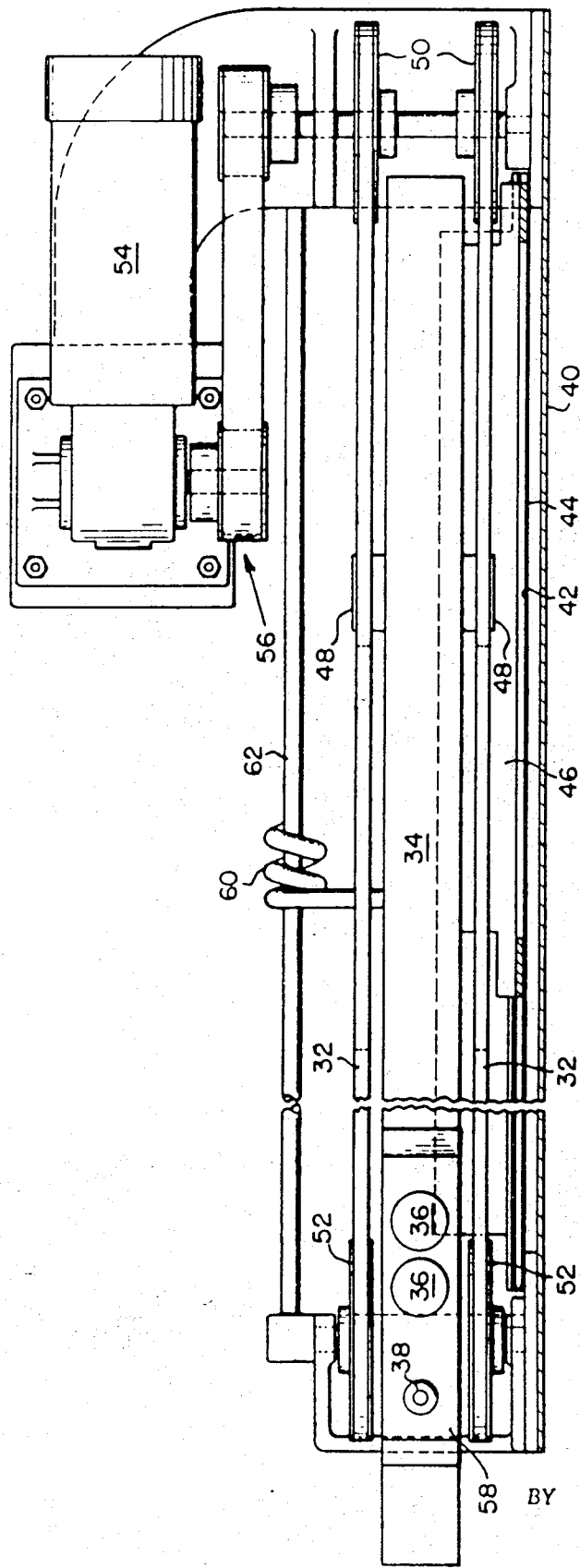
FIG. 2 is a foreshortened elevation view partly in section of the positioner of the present invention in a retracted position.

As shown in FIG. 2, each positioner includes a fixed base member 40 having ways 42 which are lined with any suitable replaceable bearing material 44 and extend substantially the full length of the base. Base 40 and ways 42 slidably support carriage 46 which in turn supports boom 34 in a cantilevered fashion. The boom is fixed to each endless belt 32 by any suitable means such as clamps 48 for moving both the carriage and boom along the ways. The belts 32 pass over the drive pulleys 50 at one end of the base and idler pulleys 52 on the other end of the base. The drive pulleys 50 are driven by any suitable means such as a reversible drive motor 54 which drives pulleys through a belt drive mechanism generally indicated at 56. With this arrangement, belts 32 can be driven to move carriage 46 to the left as shown in FIG. 2 to extend the boom from the base or to move the carriage to the right as viewed in FIG. 2 to retract the extended boom.

Nested within the outward extending end 58 of boom 34 are the electromagnets 36 and switch 38 provided for purposes set out hereinbelow. Energy is supplied to both the switch and electromagnets by a coiled cable 60 which rides one and is guided by a rod 62 extending substantially the length of base 40.

Figure 4:
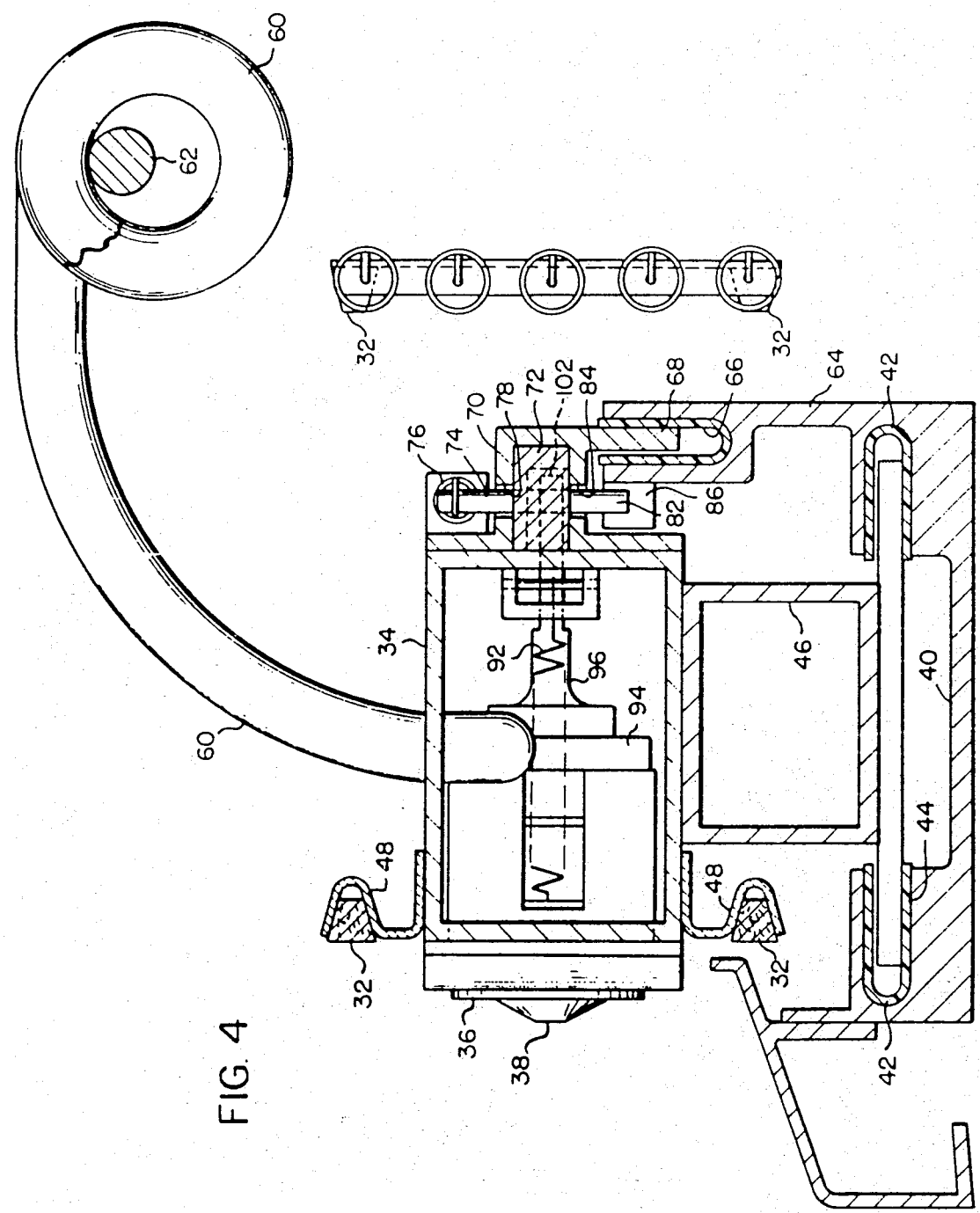
FIG. 4 is a sectional view on a larger scale taken along lines 4—4 of FIG. 3.

Referring to FIG. 4, base member 40 includes an upstanding rearward portion 64 which contains ways 66 for purposes of guiding a slide member 68. Slide member 68 acts to steady the boom and is formed by a downward projecting portion of a guide member 70 attached to the rear of boom 34. Supported slidably within guide member 70 is a shuttle 72. Shuttle 72 is driven together with boom 34 for a first portion of the travel of the boom and then is held in a fixed position during a second portion of the travel of the boom in order to produce a relative sliding motion between the shuttle and boom in the manner set out hereinbelow.

For purposes of driving the shuttle with the boom, the shuttle is connected to the boom by means of a pin and spring 74,76 respectively. Pin 74 is fixed to the shuttle and slidably extends through an elongated slot 78 in the upper surface of guide member 70. Spring 76 which is fixed at one end to the boom (FIG. 3) and at its other end to pin 74 draws the pin and therefore the shuttle against one end 80 of the slot. With this arrangement, shuttle 72 is carried along with the boom during the first portion of boom travel.

Figure 3:
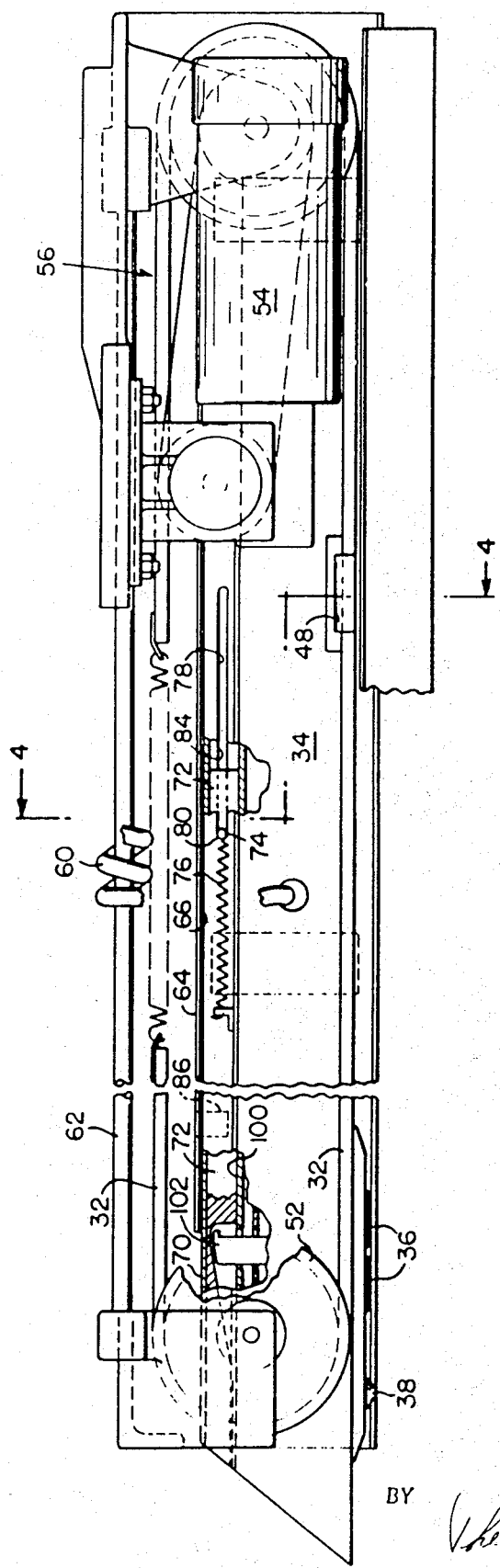
FIG. 3 is a foreshortened plan view of the positioner partly broken away and in sections.

In order to stop the movement of the shuttle to permit relative sliding motion between the shuttle and the boom, the shuttle is provided with a second pin 82, which is attached to the bottom surface of the shuttle (FIG. 4). Pin 82 extends through a corresponding clearance slot 84 in the bottom of member 70. As shown in FIGS. 3 and 4, a stop block 86 attached to the upstanding rearward portion 64 of the base is disposed in the path of travel of pin 82. Therefore, after movement of the boom has carried the shuttle and therefore pin 82 through the first portion of travel, the pin engages stop block 86 which prevents further motion of the shuttle with respect to base 40. However, because of the sliding relationship between boom 34 and shuttle 72, the boom can continue to move relative to the shuttle and against the bias of the spring 76 until the boom is fully extended. During the return stroke of the boom, the bias of spring 76 returns the shuttle to the position as shown in FIG. 3.

Figure 5:
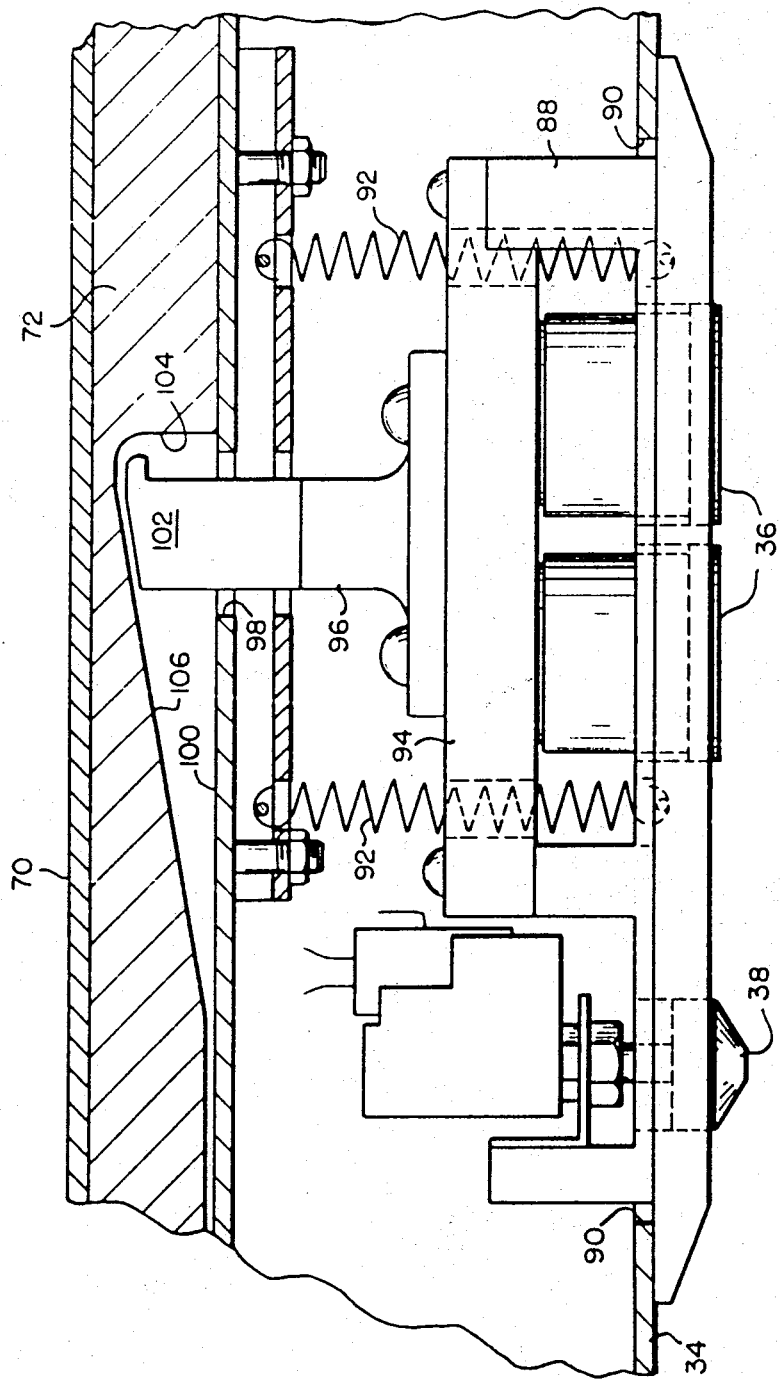
FIG. 5 is an enlarged view of the magnetic coupling portion of the positioner.

This relative motion between the shuttle and boom during the second portion of boom travel is utilized to extend magnets 36 outwardly from the boom in order to permit the magnets to engage the container. As shown in FIG. 5, electromagnets 36 are part of an assembly including a frame 88 which extends through an opening 90 in the boom. The frame is spring biased by a pair of springs 92 which normally act to keep the frame and magnets nested within the boom. The rearward end 94 of the frame carries a foot member 96 which extends through an opening 98 in the rear wall 100 of the boom. This foot member 96 terminates in a cam 102 which is nested in a pocket 104 formed in the shuttle. One surface 106 of the pocket adjacent cam 102 is a cam surface. With this arrangement, relative movement of boom 34 with respect to shuttle 72 moves cam 102 across cam surface 106 to drive frame 88 and therefore magnets 36 outwardly from their nested position within the boom. On the return stroke of the boom, springs 92 return the frame 88 and magnets to their nested position.

Also mounted on frame 88 is switch 38 which has its electrical connection, not shown, in the electrical circuit of electromagnets 36, also not shown. Upon engagement with the surface of a container, the switch is depressed to close the circuit energizing the electromagnets. With the electromagnets energized, the container is firmly fixed to the boom so that movement of the boom will now also move the wheeled container. Any suitable limit switches (not shown) may be used to deenergize the electromagnets to release the container at the appropriate position in the travel of the boom.

By way of example and in order to describe the operation of the positions of the present invention, it will be assumed that the operation begins after the container 16 has been deposited on platform 24 by transporter 10 and detached from yoke 14. At this time any suitable control means, which form no part of the present invention, energizes the drive motor 54 of positioner 28 in order to drive the boom into the shaftway. During the greater portion of travel, the boom and shuttle move together. However, when the boom has moved to a position which places magnets 36 in the shaftway and adjacent the rear of the container, shuttle pin 82 engages stop 86 to stop the movement of the shuttle with respect to the base. Further movement of the boom now moves cam 102 across cam surface 106. This drive frame 88 and magnets 36 outwardly from their nest in the boom and against the sidewall of the container. The outward movement of frame 88 also causes switch 38 to engage the container which closes a circuit for energizing the magnets. With the magnets energized, the container becomes magnetically attached to the magnets so that any movement of the boom will also move the container. As the boom nears the end of its working stroke, any suitable arrangement of limit switchs (not shown) reverses drive motor 54 to drive the carriage away from the shaftway opening. This moves the boom so as to withdraw the wheeled container through the shaftway opening and onto the floor surface. As the container is being moved through the shaftway opening, the resilient loading of springs 92 allows the container to float and follow a path of least resistance. When the boom has completed its return stroke, another set of suitable limit switches, also not shown, deenergizes the drive motor and opens the circuit of the electromagnets so that the container can be removed from against the boom and moved manually to its final destination.

Positioner 30 is utilized for assisting in automatically moving a second container into the shaftway for loading onto a transport vehicle 10. For example, as positioner 28 is withdrawing one container from the shaftway, a second container can be manually pushed against the magnets 36 and switch 38 of positioner 30. Pushing the container against switch 38 closes the circuit to the electromagnets so that the second container becomes magnetically attached to positioner 30. After the first container has been removed from the shaftway by positioner 28, the first container is released from the positioner and the drive motor for position 30 is energized for moving the second container to the left as viewed in FIG. 1 to transfer the container onto positioner 28. The magnets of positioner 30 are deenergized to release the container and the positioner returned to its stored position as shown in FIG. 1. The magnets of positioner 28 are energized to attach the container to the boom and the positioner moved to insert the container into the shaftway. As positioner 28 moves container 16 into the shaftway, the engagement of a guide 108 on platform 24 with a guide slot 110 in container 16 insures that the container is accurately positioned for pickup by a transport vehicle 10. The resilient loading of spring 92 again permits the container to seek a path of least resistance as it is moved into the shaftway. With the container in the shaftway opening, the magnets are deenergized, positioner 30 retracted and the door into the shaftway closed to await the arrival transport vehicle.

Thus, it will be appreciated that the present invention accomplishes its intended objects in providing a positioning mechanism which becomes magnetically attached to the container for moving the container through a shaftway opening. Since the magnets are spring mounted in their nests, a container is not rigidly attached to the boom but has some freedom to float so that the container may follow a path of least resistance to prevent the container from becoming separated from the magnets, if, for example, the wheels of the container become temporarily snagged.

The use of a boom which can extend into the shaftway, eliminates any need for a mechanism permanently mounted within the shaftway for moving containers through the shaftway opening. Further, the positioners, being floor mounted against a wall surface occupy only a minimum of space and are easily accessible for maintenance or repair. Since positioner 30 is used during the loading process by manually pushing the wheeled container against the position, there is no need to provide position 30 with a shuttle mechanism whereas a shuttle is essential to the operation of positioner 28.

Having thus described the invention, what is claimed as new is:

1. Apparatus for moving mobile self-supporting articles, made at least partly of a magnetic material, along a floor surface comprising:
   a. a movable carriage;
   b. a boom mounted cantilever fashion on said carriage, the unsupported end of said boom extending beyond an end of said carriage in a direction of carriage motion and the unsupported end having an opening at one side thereof;
   c. a reversible motor for moving said carriage through a limited path of travel;
   d. a magnetic assembly resiliently nested in said opening in the unsupported end of said boom, said assembly being disposed for movement through said opening; and
   e. drive means associated with said magnetic assembly, and operable when said carriage is adjacent one end of its path of travel for driving said magnetic assembly from its nest and through said side opening in a linear direction normal to the path of carriage travel and against said mobile article to attach said article to said boom.

2. Apparatus for moving mobile self-supporting articles, made at least partly of a magnetic material, along a floor surface comprising:
   a. a movable carriage;
   b. a boom mounted cantilever fashion on said carriage, the unsupported end of said boom extending beyond an end of said carriage in a direction of carriage motion;
   c. a reversible motor moving said carriage through a limited path of travel;
   d. a magnetic assembly resiliently nested in the unsupported end of said boom; and
   e. drive means associated with said magnetic assembly for driving said magnetic assembly from its nest and against said mobile article to attach said article to said boom when said carriage is adjacent one end of its path of travel, said drive means including a cam surface fixed in the path of travel of said magnetic assembly and a cam follower on said magnetic assembly, said boom moving said assembly and therefore said cam follower across said cam surface for driving said assembly from its nest.

3. Apparatus as in claim 2 wherein said drive means comprises:
   a. a shuttle slidably carried by said boom, said shuttle having said cam surface thereon adjacent to and engageable with said magnetic assembly; and
   b. means moving said shuttle with respect to said magnetic assembly for camming said magnetic assembly from its nest.

4. Apparatus as in claim 3 comprising bias means connecting said shuttle and boom.

5. Apparatus as in claim 4 wherein said means for moving said shuttle with respect to said magnetic assembly comprises a stop located in the path of travel of and engagable with said shuttle, the engagment of said stop and shuttle acting to move said shuttle with respect to said boom and drive said assembly across said cam surface.

6. Apparatus as set forth in claim 2 wherein said magnetic assembly comprises:
   a. a movable frame nested in said boom and engagable with said means;
   b. bias means connecting said frame and boom for resiliently retaining said frame in said nest; and
   c. an electromagnetic carried by said frame, said drive means engaging said frame for driving said frame against said bias means and from said nest to abut said electromagnetic against said article.

7. Apparatus for moving mobile, self supporting articles through a shaftway opening and along a floor surface comprising:
   a. a fixed base having guides defining a path of travel to a shaftway opening;
   b. a carriage riding on said guides;
   c. a reversible motor on said base for moving said carriage along said guides to and from said shaftway opening;
   d. a cantilevered boom mounted on said carriage, the unsupported end of said boom extending through said shaftway opening when said carriage is adjacent said opening;
   e. a magnetic assembly nested in the unsupported end of said boom;
   f. a shuttle carried by said boom toward said shaftway opening said shuttle having a cam surface thereon adjacent said magnetic assembly; and
   g. means moving said magnetic assembly with respect to said shuttle and cam surface for driving said assembly from said nest and against said mobile article.

8. Apparatus as set forth in claim 7 comprising a switch on said frame in the electrical circuit of said electromagnet, said switch being adapted to close said circuit and energize said electromagnet when said magnets and switch abut said article.

9. Apparatus as set forth in claim 7 wherein said magnetic assembly comprises:
   a. a frame nested in said boom;
   b. bias means connecting said frame and boom;
   c. an electromagnet carried by said frame; and
   d. a cam follower on said frame engagable with said cam surface on said shuttle wherein moving said shuttle with respect to said magnetic assembly moves said cam follower across said cam surface for driving said frame from its nest against the influence of said bias means.

10. Apparatus as set forth in claim 7 wherein said shuttle is slidably carried by and is resiliently connected to said boom, said means including a stop in the path of travel of said shuttle for stopping the movement of said shuttle with respect to said base to permit movement of said boom with respect to said shuttle against said resilient connection to drive said magnetic assembly across said cam surface.

* * * * *